(12) United States Patent
Hinderling et al.

(10) Patent No.: US 7,511,805 B2
(45) Date of Patent: Mar. 31, 2009

(54) HOLOGRAPHIC TEST PLATE FOR POSITIONING AND ALIGNING PIPES

(75) Inventors: Jürg Hinderling, Marbach (CH); Peter Kipfer, Marbach (CH); Anton Kehl, Ruethi (CH); Jeffrey Victor Harrington, Kent City, MI (US); Klaus Schneider, Dornbirn (AT)

(73) Assignee: Leica Geosystems AG, Heerbrugg (CH)

( * ) Notice: Subject to any disclaimer, the term of this patent is extended or adjusted under 35 U.S.C. 154(b) by 244 days.

(21) Appl. No.: 11/287,390

(22) Filed: Nov. 28, 2005

(65) Prior Publication Data
US 2007/0121101 A1   May 31, 2007

(51) Int. Cl.
G01C 1/00 (2006.01)
G02B 5/32 (2006.01)

(52) U.S. Cl. ......................................... 356/154; 359/15
(58) Field of Classification Search ................. 356/620, 356/138, 457; 359/1, 15
See application file for complete search history.

(56) References Cited

U.S. PATENT DOCUMENTS 5,095,629 A   3/1992   Klemer et al.
5,770,850 A   6/1998   Bowen et al.
6,313,908 B1 *   11/2001   McGill et al. ............... 356/28.5
6,622,392 B1 *   9/2003   Bourget ......................... 33/293

FOREIGN PATENT DOCUMENTS

| DE | 10116018 A1 | 10/2002 |
| DE | 20 2004 000 503 U1 | 5/2004 |
| DE | 10335207 A1 | 2/2005 |
| WO | WO 97/08509 | 3/1997 |
| WO | WO 2007/059847 A1 | 5/2007 |

* cited by examiner

Primary Examiner—Roy Punnoose
Assistant Examiner—Tara S Pajoohi
(74) Attorney, Agent, or Firm—Oliff & Berridge, PLC

(57) ABSTRACT

A target plate (Z) according to the invention for positioning components, in particular pipes (R1, R2), has a holographic optical element as a holographic diffusor. By means of the diffusor, radiation striking the target plate (Z) in the form of a reference beam (RS) can be guided very accurately and virtually without loss into a defined solid angle region (dΩ). Furthermore, the diffusor may have stochastically distributed structures and thus illuminate the solid angle region (dΩ) homogeneously. By means of the target plate (Z), the visibility of the incident reference beam (RS) is increased, and the reference beam (RS) can also be detected independently of position.

15 Claims, 3 Drawing Sheets

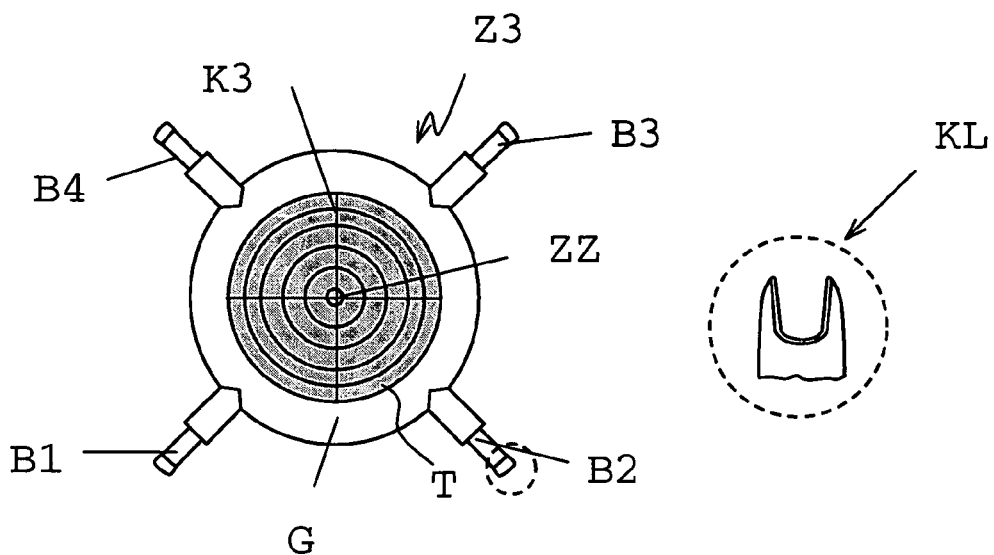
Fig.2C
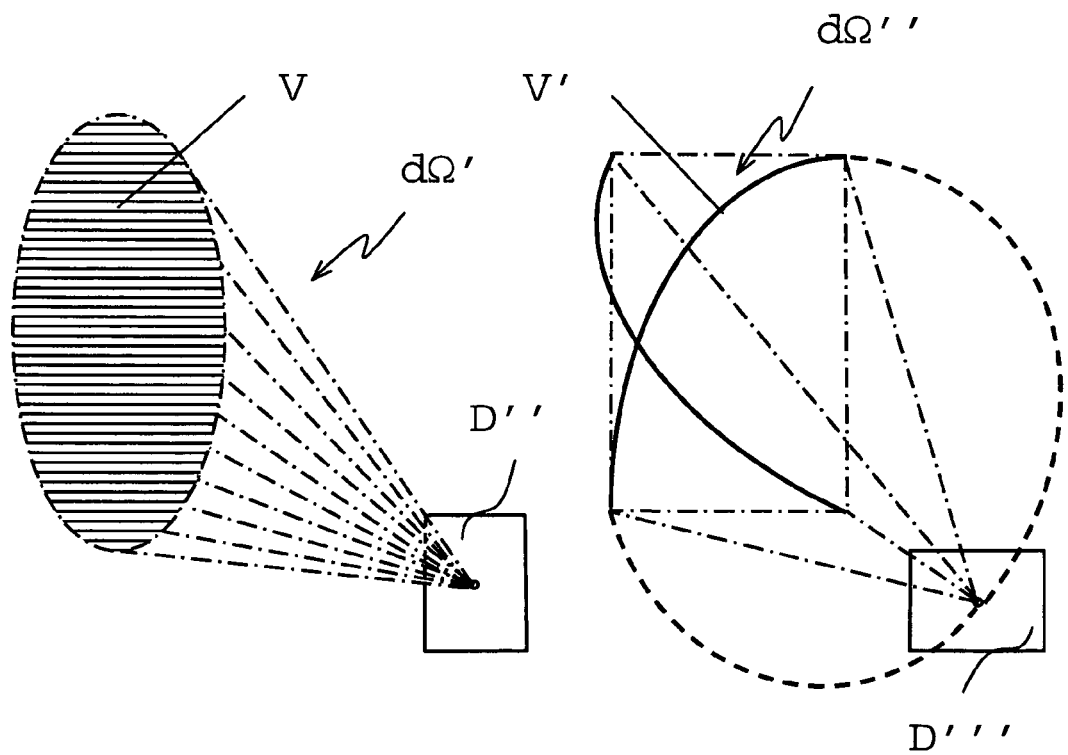
Fig.3A                    Fig.3B

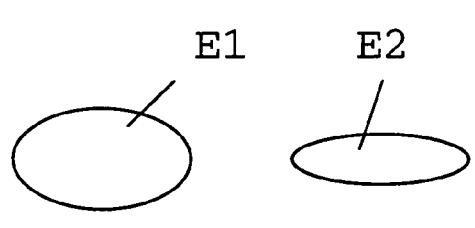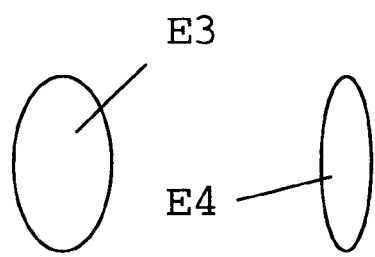
Fig.4A	Fig.4B
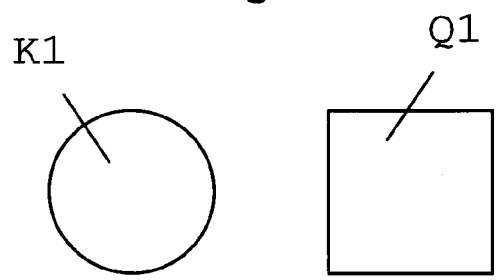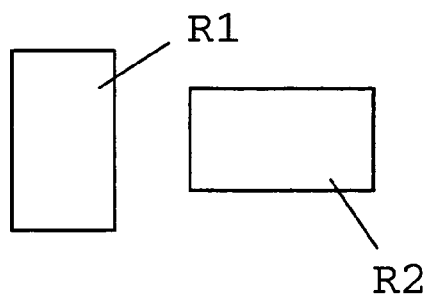
Fig.4C	Fig.4D

HOLOGRAPHIC TEST PLATE FOR POSITIONING AND ALIGNING PIPES

BACKGROUND OF THE INVENTION

The invention relates to a target plate for positioning components and a corresponding optical system.

In the prior art, the positioning and alignment of workpieces, components or construction machines is frequently effected by means of optical systems which provide the advantages of fast, accurate and non-contact measurements. The positioning can be effected, for example, by a position determination by the system, but the positioning is often also carried out "directly" relative to the visible optical radiation emitted by a transmitter. Thus, a laser beam for producing a reference axis is emitted, for example, by means of a positioned and aligned laser transmitter or a reference plane is defined, for example by means of a rotating laser. For determining the position or for visualizing the radiation, active or passive target elements are generally used.

In pipeline construction, too, optical systems, generally laser reference systems comprising canal construction lasers and target plates, are preferably used for accurate laying of the pipes. The alignment of the laser beam is often carried out relative to the gravity corer so that such laser devices are generally provided with a tilt sensor. The laser is accurately aligned or is aligned concentrically with the pipe in the starting shaft. By means of the laser, it is then possible to produce a reference beam as a reference axis for—further—pipes to be laid. For this purpose, a target plate is inserted into the pipe. The target plate is mounted concentrically on or in the pipe, at that end of the pipe facing a worker, opposite the starting shaft. If the laser reference beam strikes the center of a—generally imprinted—target mark of the target plate, the pipe is correctly positioned and aligned.

The laying of pipes takes place, as a rule, as follows: an excavator or crane operator lowers the pipe into a trench while a worker stands in or next to the trench and monitors the position and alignment of the pipe. He gives instructions to the operator and if necessary corrects the position of the pipe manually. The monitoring is effected on the basis of the reference signal on the target plate fixed on/in the pipe. If a collimated laser beam, as in devices of the prior art, is focused as a circle on the target plate, for example a focusing screen, the line of sight of the worker must be along the axis of the beam if he intends to detect the position of the pipe relative to the beam. The worker must therefore lie in the trench or constantly bend in order to align the pipe. In the case of inaccessible trenches, positioning by means of such a device is not feasible.

To enable a worker to receive a signal in the upright position or in a position remote from the longitudinal axis of the pipe, U.S. Pat. No. 5,095,629 describes a target and a target plate system which transmits incident laser radiation and deflects it into an aligned, conical angle range. For this purpose, structures are introduced into the surface of the target in order to direct the beam in a certain direction, for example in the direction of an upright worker. The structures of the surface of the target have a periodic lattice and therefore have the disadvantage of scattering the radiation with highly irregular brightness in a predetermined angle range. In certain directions or at certain angles, the worker is dazzled, whereas at directly adjacent angles the light spot is scarcely visible on the target plate. These brightness variations irritate the worker. Furthermore, such targets produce significant "side lobes" in directions not relevant for the application, which means that the transmitted beam correspondingly declines in intensity.

Moreover, the formation of such a target having macroscopic structures is susceptible to environmental influences, such as dirt, moisture or mechanical abrasion. The surfaces must therefore be protected with a cover plate, so that a complicated design follows. Furthermore, the structure of the surface is designed for scattering radiation in a predetermined angle range; in the event of deviations from the corresponding position the beam projection is only weak or is no longer detectable at all.

DE 20 2004 000 503 U1 describes an optical system having a video camera, in which system the optical axis is aligned rigidly parallel to the longitudinal axis of a pipe to be laid, and the objective of which video camera points in the direction of the pipe openings. Arranged between the video camera and the pipe is a planar, optically partly transparent screen which is sharply focused by the video camera and is displayed on the video monitor of the camera. The operator can recognize the point of incidence of the laser on the screen and hence the alignment of the pipe to be laid. According to the possibility of remote observation by cable or radio, there is no longer any need for a person to be on site in the trench. However, the video camera is a complex sensitive optical device which is easily damaged during rough construction work. Moreover, the optical system at the pipe end requires an electrical supply, so that the use necessitates greater complexity. Furthermore, the system demands corresponding installation and operation by the workers on the building site, which, inter alia, can hinder the smooth course of the work.

BRIEF SUMMARY OF THE INVENTION

The object of the invention is to provide a target plate for the positioning of components, in particular pipes or support systems, relative to a reference beam, which target plate provides improved visibility of the reference beam.

A further object is a simply designed, easily handled target plate which is insensitive to incorrect manipulation.

A further object is an optical system comprising a radiation source for the emission of a reference beam and a target plate for improved visualization thereof, in particular in daylight.

These objects are achieved by the subjects of the features of claims 1 and 13 and by the features of the dependent claims, or the solutions are further developed.

According to the invention, a target plate has a first and second surface and an optical holographic element, the first and second surface being formed so as to be optically transmittive and the second surface having a target mark. Furthermore, a holder or fixing device for arranging the target plate on or in a component to be positioned—with the aid of the target plate—can be provided on the target plate. However, the target plate can equally well be inserted into an—external—holder/fixing means.

For positioning the component, a reference beam is emitted by a radiation source. The radiation source is preferably a laser transmitter. When a laser is referred to as radiation source below, however, other sources are not excluded and can also be used as an alternative. The position and emission direction of the laser are adjustable. Thus, it is possible to generate a beam which establishes a reference axis.

In pipeline construction, either the laser is adjusted according to a planned pipe system, for example according to the plan of a canal system, or it is arranged relative to already laid pipes. If pipes or pipe parts have already been laid in accordance with the plan, the laser is positioned in a—first—pipe opening, and the longitudinal axis of the pipe is traced by means of the emitted reference beam. Thus, further pipes can be connected to the already laid pipes—at the second opening thereof—and can be arranged relative to the reference axis, an exact gradient relative to the perpendicular being maintained.

For exact positioning of the pipe, the target plate can be used by arranging it at the non-connecting opening of the pipe to be laid. The arrangement is to be implemented in a manner such that the longitudinal axis of the pipe, i.e. the middle of the pipe, coincides with the target mark of the target plate. For arranging the target plate, a position-stable connection thereof with the pipe can be provided. This can be effected by means of a holder which can be fixed on the pipe or positioned in a stable manner in the pipe and is preferably provided with a spirit level. Equally, fixing elements can be mounted directly on the target plate or the target plate may already have a fixing facility optionally formed integrally with said target plate. In principle, all types of fixing or connection can be used, in particular units adapted to the cross-section of the pipe or of the component to be positioned.

The target plate has a first and a second optically transparent surface. The surfaces form a front and back of a target plate base body; for example, they may be the front and back of a glass body. From the functional point of view, an optically transparent plastic element is advantageous as the target plate body. The two-surface body can be formed in a multiplicity of geometrical shapes, for example as a rectangle, square or disk. It can also be adapted to the geometry of a component to be positioned, for example adapted in size and shape to the pipe cross-section in the case of a pipe as a component.

The front or first surface is the surface which faces or which is to face the radiation source, while the back or second surface is preferably substantially parallel to the first surface and faces in the opposite direction to it. The preferred cross-section of the base body—in particular since it can be produced simply and economically—is rectangular or square.

Other geometrical shapes which are advantageous in certain circumstances are, however, not ruled out thereby.

The—transparent, colorless or colored—base body is optically transparent, for example comprising plastic or glass. Radiation incident on the first surface passes through the surface transparent to the radiation, and also through the second transparent surface. The radiation is finally visualized on the second surface, for example as a visible circle.

According to the invention, the target plate has a holographic optical element, referred to below as HOE, by means of which element the "beam spot" realized on the second surface is produced, extended and diffracted in a defined solid angle range.

Holographic optical elements are holographic recordings having the property of converting the incident radiation into a wave field of complex three-dimensional form. For example, the properties of optical elements, such as lenses, gratings, mirrors or beam splitters, can be emulated. In particular, however, holographic structures which destroy the three-dimensional coherence of the laser wave are possible. Only through this does the beam spot become visible in the plane of the hologram. In contrast to conventional optical systems, HOEs also make it possible to realize much more complicated beam guidance which could not be realized to date. The digital, computer-generated holograms which permit virtually any form of the diffracted wave field may be mentioned in particular.

Holograms to date, including synthetic ones, were, however, not capable of producing large deflection angles—as are required, for example, in the case according to the invention. Furthermore, the angle of incidence of the reference beam on the HOE had to date a disadvantageous influence on the diffraction efficiency and the diffraction behavior. Consequently, the shape of the scattered light cone after the hologram was destroyed. Further problems resulted from the limited wavelength range, but a target plate of the generic type should be capable of being used, as desired, simultaneously for lasers with various colors. A further weakness lay in the lack of UV stability in sunlight.

Synthetic HOEs which no longer have said disadvantages are available today. By means of very fine structures in the submicrometer range, it is possible to produce numerical apertures greater than 0.6 or fan angles >75 degrees. Furthermore, the chromatic aberration is eliminated over the required spectral range by a so-called "harmonic diffractive structure". Such "harmonic diffractive structures" are a combination of structures of first and higher order diffraction. Randomized, i.e. highly non-periodic, diffraction structures support the quasi-achromatic beam deflection. In spite of the achromaticity achieved, it has recently also become possible to suppress the selectivity of the angle of incidence on the HOE plates. The surfaces having the "harmonic diffractive structures" are quasi-two-dimensional, so that the Bragg condition associated with three-dimensional structures can be circumvented. The optical wave field after the HOE is to a first approximation independent of the tilting of the holographic surface relative to the reference beam.

The efficient processes for the production of synthetic HOEs constitute a further advantage. Today, for example, various optical plastics from the material group consisting of thermoplastics and thermosetting plastics are available and can be processed economically and in large quantities by injection molding, compression molding or embossing to give HOES. By means of novel chemical additives, such as antioxidants or HALS (sterically hindered amines), the UV stability thereof can also be ensured.

The HOE of the target plate according to the invention is in the form of an optical diffusor for a collimated laser beam. Such a holographic diffusor can have the effect of a beam-diverging lens, or, in combination with structures having a prismatic effect, can combine beam divergence and beam guidance. Simultaneously with these diffraction effects, there is a reduction of the three-dimensional coherence of the laser phase. The at least partial destruction of the phase relationships is based in the case of phase holograms on a pseudostochastic arrangement of the structures accompanied by large deflection angles or, in the case of amplitude holograms, on decorrelating scattering centers, such as silver halide complexes. It is therefore possible to emulate the entropic effect of a diffuse plate since the HOE is not tied to an optical axis. The HOE component according to the invention has, in a known manner, at least one phase hologram or weakly absorbing amplitude hologram having the following properties:

high transmission efficiency, >80%,
specified solid angle distribution up to >100 degrees,
homogeneous light distribution in the scattered light cone,
<2% energy in zero order,
independent of the polarization of the reference beam,
uniform degree of low three-dimensional coherence,
no Moire phenomena,
achromaticity over the required wavelength range.

The at least one synthetic hologram can in principle be recorded or copied onto all known recording materials or copying and replicating materials.

Computer-generated phase structures are advantageous for producing holograms having the required properties. The diffracting structures are formed as surface reliefs and produce the required optical properties with high efficiency. Of course, holograms which are optically analogously produced/recorded and/or optically copied are also conceivable.

Suitable support materials are, for example, photosensitive glasses, photosensitive emulsions or optical plastics.

Plastics which are produced by the method of injection molding, injection molding with holding pressure or compression molding are particularly economical and have the required scattering properties. The holographic information is introduced in the form of a surface structure into the injection mold or embossing mold. Holograms produced by replicas consisting of UV-curable adhesive, UV-catalyzing inorganic-organic hybrid polymers, such as sol-gels, or other ceramic-type substances suitable for replication can also be realized.

Optically transparent plastics, such as polycarbonate, polyester and acrylates, but recently also increasingly cycloolefin (COC) and copolyester (COP), are being used for the holographic production process.

Thus, in the process for the production of embossed holograms, a so-called master hologram is produced by exposure on a special high-resolution recording material, such as a photoresist, whose microfine holographic interference structure can be developed into a surface relief. By galvanic casting, this surface relief can be embossed in a known manner into—for example, metallized sheets. An embossed hologram embossed—as a holographic microrelief—or onto a reflective sheet can thus be provided. Such embossed holograms can be mechanically replicated and can thus be cheaply produced in long runs.

The photoresist-transferred master hologram can, however, also be transferred directly into the glass wafer underneath by means of etching technology, and such holograms are of particularly high quality with regard to their holographic interference structure.

Computer-generated holograms, so-called CGHs, are also advantageous, the hologram being easily calculated by means of the computer and the calculated structure being written into a photosensitive layer. Digital production processes reached maturity in recent years. In contrast to analogously produced holograms, the form of the diffraction effect by means of numerical methods is far more flexible and indeed is virtually unlimited. Furthermore, the range of material was greatly extended with the digital method. While photographic materials having a photosensitive recording layer are required in the case of analog holography, the image information can be transferred to a suitable support material in the digital method—for example by means of laser-controlled, lithographic processes.

With the synthetic production of the structures, the possibilities for the form of the emerging light beam are considerably extended. Furthermore, diffraction efficiencies of more than 90% can be achieved, in particular for multistage relief structures.

By appropriate design of a holographic diffusor, the received radiation can furthermore be extremely uniformly distributed in the desired direction or the desired solid angle range. Irregularities in the energy distribution of the radiation source used can be eliminated, and back-scattering effects or scattering in directions outside the desired range can also be substantially eliminated, so that the radiation is guided substantially without loss in the desired direction. Losses through unscattered light are less than 1%. It is therefore possible to achieve an energy distribution of a beam emerging from the diffusor which is extremely accurately controlled—in the horizontal and vertical directions. In particular, the beam can be guided in virtually any desired form in solid angle regions.

If the surface reliefs of the holographic diffusers have an irregular structure in the lateral direction, a uniform light distribution with homogeneous luminous intensity is achievable. In addition, a more wavelength-independent scattering effect is provided with stochastic structures in the axial direction. The light distribution in the scattering cone can be configured by the type and precision of the relief structures. A quasi-homogeneous phase mixture is achieved through suitably chosen stochastic structures, it being possible for the differences in the optical phase differences at the observer's location to be more than 100 wavelengths (number of Fresnel zones >100). The scattering cone is therefore composed of randomized diffraction cones, where diffraction orders are highly mixed. In the case of homogeneously illuminated, vertical and/or horizontally extensive solid angle regions, the divergent beam is detectable from a large number of directions. In particular, the diffraction structure can be designed so that the radiant intensity behind the diffusor is independent of the scattering angle. Because the transmission and diffraction or scattering efficiency is increased compared with classical diffusers, for example doubled, the brightness and hence the visibility of the beam is correspondingly increased. For example, scattering efficiency for at least one range of an angle of incidence of the reference beam relative to the target plate of +/−15 degrees may decrease by not more than 10%.

If the surface reliefs of the holographic diffusers have an irregular structure in the lateral direction, a uniform light distribution with homogeneous luminous intensity is achievable. In addition, a more wavelength-independent scattering effect is provided with stochastic structures in the axial direction. The light distribution in the scattering cone can be configured by the type and precision of the relief structures. A quasi-homogeneous phase mixture is achieved through suitably chosen stochastic structures, it being possible for the differences in the optical phase differences at the observer's location to be more than 100 wavelengths (number of Fresnel zones >100). The scattering cone is therefore composed of randomized diffraction cones, where diffraction orders are highly mixed. In the case of homogeneously illuminated, vertical and/or horizontally extensive solid angle regions, the divergent beam is detectable from a large number of directions. In particular, the diffraction structure can be designed so that the radiant intensity behind the diffusor is independent of the scattering angle. Because the transmission and diffraction or scattering efficiency is increased compared with classical diffusers, for example doubled, the brightness and hence the visibility of the beam is correspondingly increased.

The solid angle region in which the radiation is guided by means of a holographic optical diffusor can be configured virtually as desired by means of the diffusor structures. Thus, diffusors having circular, elliptical, square or rectangular angle distribution can be produced. The light distribution within the conical fan can assume a top hat distribution, cosine distribution, cosine distribution to the n th power, dipole distribution or quadrupole distribution and a large number of further angle distributions.

BRIEF DESCRIPTION OF THE DRAWINGS

The target plate according to the invention and an optical system are described in more detail below purely by way of example with reference to working examples shown schematically in the drawings.

Specifically,

FIG. 2C shows a third embodiment of a target plate according to the invention;

FIGS. 3A-B show holographic diffusor sheets with specifically illuminated angle regions;

FIGS. 4A-D shows geometrical shapes for solid angle regions which can be illuminated by means of the target plate according to the invention

DETAILED DESCRIPTION OF THE INVENTION

Figure 1:
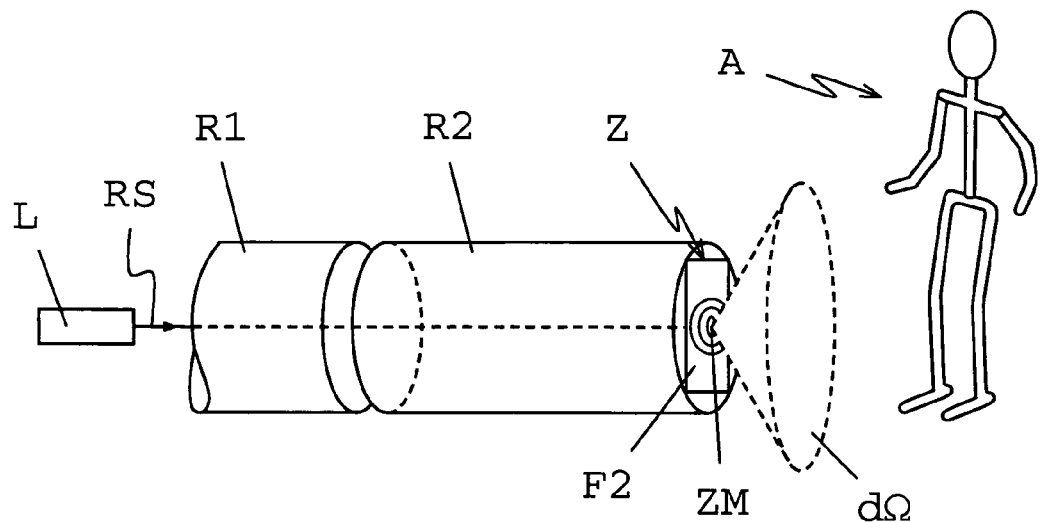
FIG. 1 shows an optical system according to the invention as a positioning system in the laying of pipes.

FIG. 1 shows a system comprising a target plate Z according to the invention in the laying of pipes. A canal laser L as a radiation source emits a reference beam RS along the longitudinal axis of an already laid first pipe R1. A target plate z according to the invention is fixed concentrically to a second pipe R2. The target plate Z has two surfaces—a first surface in the direction of the reference beam RS and interior of the pipe and a second surface F2 facing out of the second pipe R2—and is formed to be transparent to the reference beam, for example of opal glass or colored plastic. The position of the reference beam RS is indicated on the second surface F2 of the target plate Z. In this example, the rectangular target plate Z has polar coordinates, i.e. a plurality of concentric circular marking lines symmetrically around the midpoint of its surface and, owing to the arrangement concentric with the pipe, symmetrically relative to the pipe axis, the origin of the polar coordinate net being the target mark ZM. The marking lines are printed on the second surface F2. If the target mark ZM coincides with the reference beam RS indicated on the plate, the second pipe R2 is correctly positioned relative to the first pipe R1, as shown in the figure. For laying the pipe, the latter is lowered for example by a crane, into a prepared trench. A worker A in or next to the trench gives instructions to the crane operator. For this purpose, the indication of the reference beam on the target plate Z must be clearly recognizable for the worker A. For better recognizability/visibility of the reference beam position on the plate, according to the invention a holographic structure is implemented as a holographic optical element, for example as a sheet for the defined divergence of the reference beam RS, on the second surface of said plate. Here, this holographic element is designed with a radiation characteristic such that the reference beam RS is guided or caused to diverge in a horizontally and vertically extensive solid angle element dΩ. For the worker A, the position of the reference beam RS on the target plate Z is thus recognizable even from positions far away from the pipe or from the beam axis, for example outside a trench.

The holographic target plate Z used according to the invention has the advantages of great diffraction efficiency; moreover, virtually no radiation is present outside the functional solid angle element dΩ, which manifests itself in virtually double visibility of the reference light spot compared with known diffusers. Owing to the holographic structure which is randomized not only in the lateral direction but also in depth, the beam density of the apparent light source produced by the hologram and hence also the visibility within the functional solid angle element dΩ are homogeneous. Owing to the novel finely spaced relief structure in the sub-wavelength range, large deflection angles up to more than 50 degrees are achievable, so that the reference beam RS is still visible even at steep angles.

A further increase in the visibility can be achieved by optical brightening of the plastic support plate, as can be realized, for example, by mixing fluorescence indicators with the granules of the optical plastic.

Figures 2A, 2B:
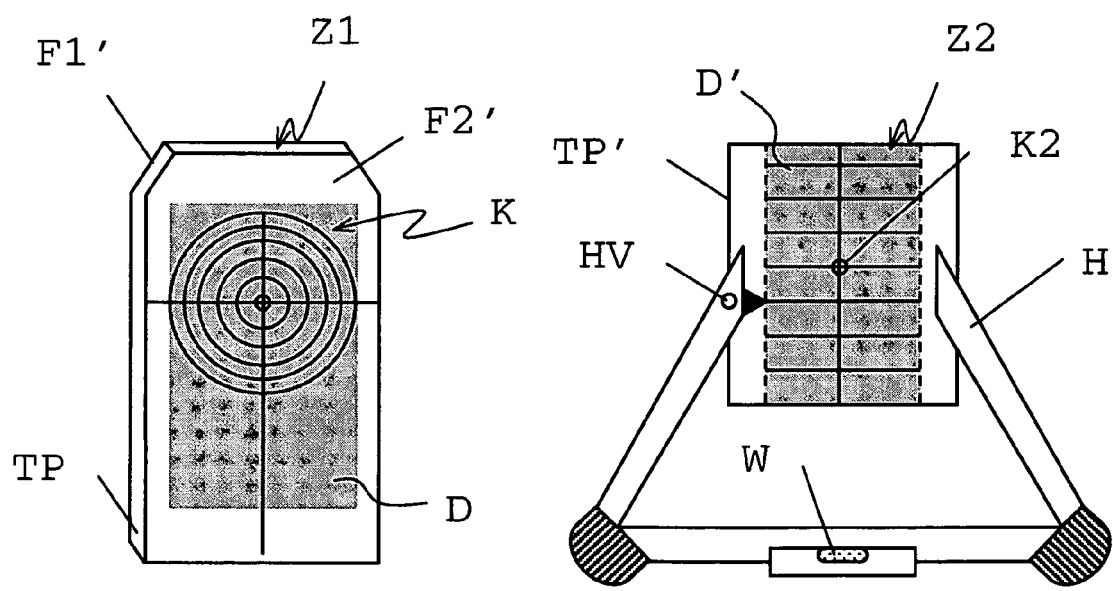
FIG. 2A shows a first embodiment of a target plate according to the invention.
FIG. 2B shows a second embodiment of the target plate according to the invention.

The partial FIGS. 2A, 2B and 2C show embodiments of a target plate according to the invention, having a holographic optical scattering element. In addition to planar structures, it is also possible to use different geometries or surfaces as target plate Z according to the invention; thus, for example, curved surfaces or extensive three-dimensional objects can also be used as target plate Z with the same functionality.

FIG. 2A shows a first embodiment of a target plate Z1 according to the invention, having a support plate TP with flattened corners as a target plate body. The support plate TP is made of transparent plastic and has a first and second surface F1', F2', circular concentric marking circles K having sector divisions in the sense of a polar coordinate system with an innermost circle as a target mark being embossed on the second surface F2'. A holographic diffusor D shown as a gray area is adhesively bonded to the second surface F2'. The diffusor D is in the form of a light beam-forming element on a transparent sheet, for example in the form of transmission holograms. Incident light is transmitted by the support plate TP, diffracted in the diffusor D and leaves the diffusor D as a beam homogeneously divergent in a predetermined solid angle region. By means of the holographic diffusor, the incident radiation is scattered efficiently and virtually without loss in the predetermined solid angle region.

FIG. 2B shows a second embodiment comprising a plate TP' having a square holographic diffusor sheet D' in a holder H. In this holder H, the target plate Z2 according to the invention can easily be placed in a pipe—or another component. By means of a height adjustment device HV on the holder H, the target plate Z2 can then be displaced so that the center mark K2 coincides with the component axis. In this second embodiment, linear, rectangular coordinates, instead of polar coordinates, are embossed on the side facing the user. The spirit level W is provided for vertical setups. It is thus possible to set or check a gradient deviating from the reference beam.

FIG. 2C shows a third embodiment of a target plate according to the invention as a circular target disk Z3. A two-surface plastic body G forms the base body of the target disk Z3. Circles defining a target center ZZ are applied to one surface of the plastic body G. The plastic support element T having a transmitted computer-generated holograph is the holographic diffusor of the target disk Z3, here too the plastic support material T being cut out, for example punched out, likewise in a disk shape and thus being adapted to the shape of the target disk Z3. In this embodiment, the target disk Z3 according to the invention has four fixing elements B1, B2, B3, B4. These may be removable or may be connected to the disk in a nondetachable manner, for example as an integral part. In the embodiment shown, the fixing elements B1, B2, B3, B4 have clamps for fixing the target disk Z3 to the outer walls of the pipe, the clamps pointing backward out of the plane of the drawing in the diagram. The fixing devices are adjustable in length and hence adjustable to different pipe diameters. An alternative is provided by radial spring buffers which can automatically hold the target disk Z3 centered relative to the pipe center. Preferably, the clamp diameters can also be adjusted and thus adapted to the various pipe wall thicknesses. FIG. 2C shows on the right a diagram of an exemplary clamp KL of the fixing element B2 on a larger scale in plan view.

The partial FIGS. 3A and 3B show two HOEs having different radiation characteristics. For simple solutions, in particular holographic optical elements embossed, injection molded or injection stamped with holograms are used, since these can be produced by mass production. In the case of photolithographically produced structures—the recording may also have been made in a plurality of stages and may therefore be even more accurate—said structures are reproduced on the basis of a so-called master hologram, from which thousands to hundreds of thousands of replications can then be produced. The structure and hence the replication characteristics can be chosen virtually as desired.

In FIG. 3A, a conically illuminated angle region dΩ' having a homogenous, constant distribution of the beam intensity V can be achieved with the holographic diffusor sheet D"; in FIG. 3B, the radiation is guided by a diffusor sheet D''' in a rectangularly shaped region dΩ" with beam intensity having a cosine or Lambert diffusion. By means of such holographic optical elements, radiation of irregular light sources, in the case of laser light having a beam profile with a Gaussian distribution, can also be homogenized, i.e. respective spatial regions can be illuminated uniformly and with high intensity regardless of the point of incidence of the laser radiation. A beam intensity having a Lambert distribution within the solid angle region dΩ" is advantageous. In the case of beam intensity V' having a Lambert distribution, the apparent light source, in particular the light spot on the target plate, appears to have on average the same brightness at any viewing angle. By the exact guidance by means of a holographic diffusor, radiation can be directed virtually without loss in solid angle regions shaped as desired, and the visibility of the radiation can be virtually doubled in comparison with conventional diffusers, because virtually no light power is dissipated, particularly outside the solid angle region dΩ".

Various exemplary geometrical shapes for angle regions, in which regions radiation can be guided by means of HOEs, are shown in the partial FIGS. 4A-4D. The lines mark the width of the respective conical solid angle regions at a beam intensity of 50% of the maximum value (FWHM=full width half maximum). FIGS. 4A and 4B show elliptical angle regions E1-E4, it being possible for the ellipses to have different horizontal or vertical dimensions depending on diffusor structure. The beam intensity of the light distribution can assume any desired profiles within the conical regions. For example, in the case of a Lambert distribution, the mean beam density or visual brightness is constant for a observer. Outside the conical regions, the beam intensity should be zero so that no radiant power is lost. FIG. 4C shows a circular and a square region K1, Q1. FIG. 4D shows a first rectangle and the first rectangle R1 rotated through 90° as second rectangle R2. It is evident that HOEs can also illuminate further non-conical angle regions, depending on design or profile. This possibility exists, for example, with the use of two spatially separated holograms, for example one on the entry side and the other on the exit side of the support plate. With two spatially separated holograms, it is also possible completely to destroy the three-dimensional coherence of the laser beam. The total laser power then appears to be extinguished for an observer from the apparent light source to the hologram. Such a hologram arrangement also permits homogenization of the light spot on the target plate itself, independently of the intensity profile of the laser beam.

The invention claimed is:

1. A target plate, comprising
a first optical transparent surface and
a second optical transparent surface having a target mark for visualization of a reference beam emitted by an optical beam source,
wherein the target plate has a holographic optical element for diverging and deflecting the reference beam into a defined solid angle region by diffraction and the holographic optical element is formed in such a way that, for a phase of a laser beam, an at least partial phase destruction takes place for reducing three-dimensional coherence.

2. The target plate as claimed in claim 1, wherein the holographic optical element is formed so as to be optically transmittive.

3. The target plate as claimed in claim 1, wherein the holographic optical element has
a holographic plate or
a holographic sheet or
a holographic film.

4. The target plate as claimed in claim 1, wherein the holographic optical element has at least one computer-generated hologram.

5. The target plate as claimed in claim 1, wherein the holographic optical element has a mixed-order diffractive structure.

6. The target plate as claimed in claim 1, wherein the holographic optical element has a castable surface relief.

7. The target plate as claimed in claim 1, wherein the holographic optical element is formed in such a way that divergence and diffraction of the laser beam takes place in a
square or
rectangular or
elliptical or
circular
solid angle region.

8. The target plate as claimed in claim 1, wherein the solid angle region comprises at least one
horizontal angle range of ±45° or
vertical angle range of ±45°.

9. The target plate as claimed in claim 1, wherein the holographic optical element is formed in such a way that light distribution in the solid angle region has a
homogeneous/constant distribution,
cosine distribution,
cosine to the n th power distribution,
dipole distribution,
quadrupole distribution or
Lambert distribution.

10. The target plate as claimed in claim 1, wherein optical power in zero-order diffraction of the holographic optical element is less than 2%.

11. The target plate as claimed in claim 1, wherein scattering efficiency for at least one range of an angle of incidence of the reference beam relative to the target plate of +/−15 degrees decreases by not more than 10%.

12. The target plate as claimed in claim 1, wherein the holographic optical element is arranged on the second optical transparent surface.

13. An optical system comprising
an optical beam source for emission of the reference beam and
a target plate as claimed in claim 1.

14. The target plate as claimed in claim 1, wherein the target plate produces a conical region as the irradiated solid angle region without producing radiant power outside of the solid angle region.

15. The target plate as claimed in claim 1, wherein an axis of a diffracted beam produced by the diffraction is different than the axis of the reference beam.

* * * * *